US010770859B2

(12) United States Patent
Langseth et al.

(10) Patent No.: US 10,770,859 B2
(45) Date of Patent: Sep. 8, 2020

(54) SHORT PULSE WAVELENGTH TUNING VIA TIMED SOLITON-DISPERSIVE WAVE INTERACTION

(71) Applicant: Massachusetts Institute of Technology, Cambridge, MA (US)

(72) Inventors: Jason E. Langseth, Malden, MA (US); Darren A. Rand, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 70 days.

(21) Appl. No.: 15/988,058

(22) Filed: May 24, 2018

(65) Prior Publication Data

US 2019/0006812 A1 Jan. 3, 2019

Related U.S. Application Data

(60) Provisional application No. 62/510,372, filed on May 24, 2017.

(51) Int. Cl.
*H01S 3/00* (2006.01)
*H01S 3/067* (2006.01)
(Continued)

(52) U.S. Cl.
CPC ........ *H01S 3/06725* (2013.01); *H01S 3/0057* (2013.01); *H01S 3/0085* (2013.01);
(Continued)

(58) Field of Classification Search
CPC .. H01S 3/06725; H01S 3/0085; H01S 3/0092; H01S 3/0057; H01S 3/0809; H01S 3/2391; H01S 3/1106; G02F 1/35
See application file for complete search history.

(56) References Cited

U.S. PATENT DOCUMENTS

2005/0265406 A1* 12/2005 Kaertner .................. G04G 7/02
372/30
2009/0296749 A1* 12/2009 Sucha ..................... G01P 3/806
372/6
(Continued)

OTHER PUBLICATIONS

Baron et al.,"Algorithm Makes Hyperspectral Imaging Faster," NC State News, 4 pages, Feb. 18, 2016.
(Continued)

*Primary Examiner* — Xinning(Tom) Niu
(74) *Attorney, Agent, or Firm* — Smith Baluch LLP

(57) ABSTRACT

When a soliton and a dispersive pulse propagate in an optical fiber, they can interact via cross-phase modulation, which occurs when one pulse modulates the refractive index experienced by the other pulse. Cross-phase modulation causes each pulse to shift in wavelength by an amount proportional to the time delay between the pulses. Changing the time delay between the pulses changes the wavelength shift of each pulse. This make it possible to produce pulses whose output wavelengths can be tuned over large ranges, e.g. hundreds of nm, in a time as short as the pulse repetition period of the laser (e.g., at rates of megahertz or gigahertz). Such a laser requires no moving parts, providing high reliability. The laser's optical path can be made entirely of optical fiber, providing high efficiency with low size, weight, and power consumption.

24 Claims, 8 Drawing Sheets

(51) Int. Cl.
    *H01S 3/08*         (2006.01)
    *H01S 3/11*         (2006.01)
    *G02F 1/35*        (2006.01)
    *H01S 3/23*         (2006.01)

(52) U.S. Cl.
    CPC .......... *H01S 3/0092* (2013.01); *H01S 3/0809* (2013.01); *G02F 1/35* (2013.01); *H01S 3/1106* (2013.01); *H01S 3/2391* (2013.01)

(56) References Cited

U.S. PATENT DOCUMENTS

| | | | |
|---|---|---|---|
| 2013/0293946 A1 | 11/2013 | Fermann et al. | |
| 2015/0015892 A1* | 1/2015 | Qiu ..................... | G01C 19/727 356/461 |
| 2016/0240995 A1* | 8/2016 | Zach .................. | H01S 3/10061 |
| 2016/0268766 A1* | 9/2016 | Burgoyne ............. | H01S 3/0675 |

OTHER PUBLICATIONS

Batz et al., "Diametrically driven self-accelerating pulses in a photonic crystal fiber," Phys. Rev. Lett. 110, 193901 (2013). 5 pages.

Genty et al., "Effect of cross-phase modulation on supercontinuum generated in microstructured fibers with sub-30 fs pulses." Optics Express 12, 4614-4624 (2004).

Goldsmith et al., "Cancellation of Raman soliton self-frequency shift by cross-phase modulation," Conference on Lasers and Electro-Optics Europe, p. 231, 2005.

International Search Report and Written Opinion in PCT/US2018/034407 dated Sep. 27, 2018, 18 pages.

Ma et al., "Sub-10-femtosecond active synchronization of two passively mode-locked Ti:sapphire oscillators," Phys. Rev. A 64, 021802(R)—Published Jul. 10, 2001. 4 pages.

Onefive Lasers & Fibers, 3 pages, downloaded Aug. 12, 2018.

Pei et al., "Observation of Spatial Optical Diametric Drive Acceleration," CLEO 2017, 2 pages.

Rothhardt et al., "High stability soliton frequency-shifting mechanisms for laser synchronization applications," J. Opt. Soc. Am. B 29, pp. 1257-1262 (2012).

Sanders, "Wavelength-Agile Lasers," Optics & Photonics News 16(5), 36-41 (2005).

Schadt et al., "Suppression of the Raman self-frequency shift by cross-phase modulation," Journal of the Optical Society of America B 5, 2374-2378 (1988).

\* cited by examiner

SHORT PULSE WAVELENGTH TUNING VIA TIMED SOLITON-DISPERSIVE WAVE INTERACTION

CROSS-REFERENCE TO RELATED APPLICATION(S)

This application claims the priority benefit, under 35 U.S.C. § 119(e), of U.S. Application No. 62/510,372, entitled "Methods of Short Pulse Wavelength Tuning via Timed Soliton-Dispersive Wave Interaction," which was filed on May 24, 2017, and is incorporated herein by reference in its entirety.

GOVERNMENT SUPPORT

This invention was made with Government support under Contract No. FA8721-05-C-0001 awarded by the U.S. Air Force. The Government has certain rights in the invention.

BACKGROUND

A tunable laser is a laser whose output wavelength can be varied in a controlled fashion. For example, changing the cavity length by moving a mirror at one end of the cavity or by heating the cavity itself may change the wavelength. But a typical tunable laser is fundamentally limited in wavelength tuning range by the bandwidth of its gain media. And the tuning speed is limited by the mechanical speed of the moving mirror or the speed with which the cavity heats up or cools down. In addition, a tunable laser with a free-space tuning element, such as a moving mirror, exhibits worse shock and vibration performance and reliability than other lasers.

SUMMARY

The inventors have exploited recent theoretical developments to make a broadband, tunable laser whose tuning mechanism is based on soliton/normal dispersive pulse interaction in an optical waveguide, such as an optical fiber. This tunable laser can vary its output wavelength quickly (e.g., >100 nm/ns at GHz pulse repetition rates) over a broad band (e.g., 120 nm) without any moving parts.

This tunable laser can be implemented as a laser system comprising a first laser source, a second laser source, a controller operably coupled to the first and/or second laser source, and an optical waveguide in optical communication with the first and second laser sources. In operation, the first laser source emits a first pulse at a first wavelength, and the second laser source emits a second pulse at a second wavelength different than the first wavelength. The controller varies a time delay between the first pulse and the second pulse. The optical waveguide, which has a zero-dispersion wavelength between the first and second wavelengths, guides the first and second pulses. Cross-phase modulation in the optical waveguide causes the first pulse to shift the second wavelength by a first wavelength shift (e.g., of about 100 nm) and the second pulse to shift the first wavelength by a second wavelength shift (e.g., of about 100 nm). The first and second wavelength shifts depend on the time delay.

The first laser source may be incoherent with respect to the second laser source.

The first laser source can include a first mode-locked laser, and the second laser source can include a second mode-locked laser, in which case the controller may include a phase-locked loop operably coupled to the first and second mode-locked lasers. In operation, the phase-locked loop synchronizes emission of the first pulse by the first mode-locked laser with emission of the second pulse by the second mode-locked laser. In some cases, the phase-locked loop synchronizes the first mode-locked laser to the second mode-locked laser with a timing jitter of less than 10 femtoseconds. The controller may be configured to detune a pulse repetition rate of the first mode-locked laser with respect to a pulse repetition rate of the second mode-locked laser so as to adjust the time delay.

Alternatively, the first laser source may include a mode-locked laser to emit the first pulse, and the second laser source may be an optical parametric oscillator, in optical communication with the mode-locked laser, to emit the second pulse in response to the first pulse. In these cases, the controller comprises an electro-optic element, in optical communication with the first laser source, to adjust the time delay.

The first pulse may have a first group velocity in the optical waveguide and the second pulse may have a second group velocity in the optical waveguide substantially equal to (e.g., within 5-10% of) the first group velocity. The first pulse may be a soliton in an anomalous dispersion regime of the optical waveguide and the second pulse may be in a normal dispersion regime of the optical waveguide.

The optical waveguide may include an optical fiber that is about 10 meters to about 30 meters long.

The cross-phase modulation may cause the first wavelength to shift toward or away from the second wavelength, depending on the time delay.

An example tunable laser may operate by coupling a first series of laser pulses at a first wavelength into an optical waveguide and coupling a second series of laser pulses at a second wavelength into the optical waveguide. Cross-phase modulation in the optical waveguide causes the first series of pulses to shift the second wavelength by a first wavelength shift. Varying a time delay between the first and second series of pulses tunes the first wavelength shift, e.g., toward or away from the first wavelength. This wavelength shift can be tuned with a sensitivity of about 30 nm per ps of time delay to about 100 nm per ps of time delay. Cross-phase modulation in the optical waveguide may also cause the second series of pulses to shift the first wavelength by a second wavelength shift.

A first laser may emit the first series of pulses, and a second laser that is temporally incoherent with the first laser may emit the second series of pulses. A phased locked loop, electro-optic element, or other controller can synchronize emission of the first series of pulses with emission of the second series of pulses with a timing jitter of less than 10 femtoseconds.

The optical waveguide can have a zero dispersion wavelength between the first wavelength and the second wavelength. Similarly, the first and second pulses may have substantially equal group velocities in the optical waveguide. The first pulse can be a soliton in an anomalous dispersion regime of the optical waveguide, and the second pulse can be in a normal dispersion regime of the optical waveguide.

The tunable laser can also be implemented with a first mode-locked laser, a second mode-locked laser, an optical waveguide in optical communication with the first and second mode-locked lasers, and a controller operably coupled to the first and second mode-locked lasers.

The first mode-locked laser emits a first series of pulses at a first pulse repetition frequency, and the second mode-locked laser emits a second series of pulses at a second wavelength different than the first wavelength and at a second pulse repetition frequency. The optical waveguide, which has a zero-dispersion wavelength between the first and second wavelengths, guides the first series of pulses and the second series of pulses. The controller varies a frequency offset between the first and second pulse repetition frequencies. This frequency offset causes a change in the time delay between the two pulses, which, in turn, causes a change in the first wavelength through changing the strength of cross-phase modulation of the first series of pulses by the second series of optical pulses in the optical waveguide.

All combinations of the foregoing concepts and additional concepts discussed in greater detail below (provided such concepts are not mutually inconsistent) are part of the inventive subject matter disclosed herein. In particular, all combinations of claimed subject matter appearing at the end of this disclosure are part of the inventive subject matter disclosed herein. The terminology used herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

A pulsed laser whose output wavelength is tuned using the interaction between a soliton and a dispersive wave in an optical waveguide can operate with a pulse duration on the order of femtoseconds or picoseconds, a pulse repetition rate on the order of Gigahertz, and a pulse-to-pulse wavelength tunability of over 100 nm. The wavelength tuning is driven by mutual cross-phase modulation between the soliton and the dispersive wave in an optical waveguide, such as an optical fiber. As each pulse propagates through the waveguide, it shifts the other pulse's wavelength by an amount that depends on the time delay between pulses and the propagation distance in the waveguide. Changing the time delay between these pulses changes the amount of the wavelength shift, making it possible to tune the laser's output wavelength electronically (i.e., by adjusting the time delay between the pulses).

Such a tunable pulsed laser can operate with a very large tuning bandwidth (e.g., >100 nm) and very high tuning speed (e.g., >100 nm/ns at GHz pulse repetition rates). Because it has such a large tuning bandwidth and high tuning speed, it can be used to increase the bandwidth and spatial resolution of spectroscopic LIDAR systems for sensing and locating different chemical and biological materials. It can also be used to deliver scan rates in optical coherence tomography that are faster than the scan rates of Fourier-domain mode-locked lasers, resulting in a higher signal-to-noise ratio for ophthalmic imaging. Furthermore, it can be used as a pump for a fiber optical parametric oscillator (OPO), increasing the tuning range and tuning speed of the OPO, e.g., for coherent Raman spectroscopy. Other applications include providing a tunable wavelength given stable dispersion and stable time delay, laser frequency locking, differential absorption LIDAR (e.g., for characterizing greenhouse gases), multi-spectral LIDAR (e.g., for foliage penetration), fast wavelength switching for wavelength division multiplexed (WDM) systems, and active hyperspectral imaging (HSI).

Cross-Phase Modulation for Wavelength Tuning in an Optical Waveguide

Two pulses, co-propagating in a fiber or other waveguide with appropriate nonlinearity and dispersion, can form a bound state in which the pair of pulses accelerates in group velocity as it travels down the waveguide. The bound state is created by cross-phase modulation (XPM), a nonlinear interaction induced by the optical Kerr effect in the waveguide material. The first pulse modulates the refractive index of the waveguide as it propagates, causing the velocity of the second pulse to change. Likewise, the second pulse causes the velocity of the first pulse to change by modulating the refractive index of the waveguide as well.

Figure 1A:
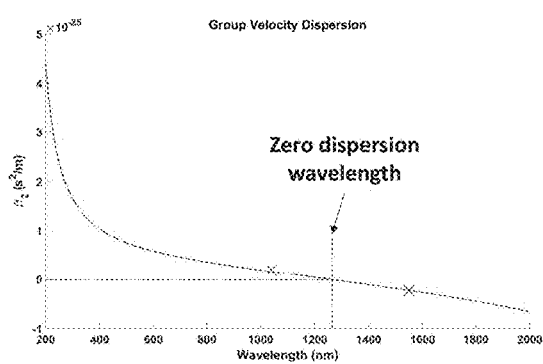
FIG. 1A is a plot of group velocity dispersion versus wavelength in an optical waveguide.
Figure 1B:
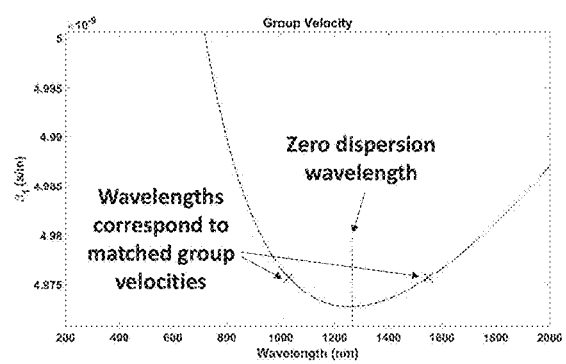
FIG. 1B is a plot of group velocity versus wavelength in an optical waveguide, with pulse wavelengths symmetric about the optical waveguide's zero-dispersion wavelength (ZDW).

If the two pulses travel at the same velocity through the waveguide, they will cause each other to accelerate. To ensure that the pulses travel at the same velocity, their wavelengths should be on opposite sides of the zero dispersion wavelength (ZDW) of the waveguide (i.e., one pulse has a wavelength that is shorter than the ZDW, in the normal dispersion regime, and the other pulse has a wavelength that is longer than the ZDW, in the anomalous dispersion regime). Typically, the group velocities of the pulses are substantially equal to each other (e.g., within 5% or 10% of each other), as shown in FIG. 1B, and their group velocity dispersions have opposite signs, as shown in FIG. 1A.

The pulse in the anomalous dispersion regime has appropriate energy to form a soliton (a pulse in which dispersion and nonlinearity balance, thus showing no temporal spreading during propagation). The acceleration of the pulses results in a redshift of one pulse and, by energy conservation, a blueshift of the other pulse.

Figures 2A, 2B:
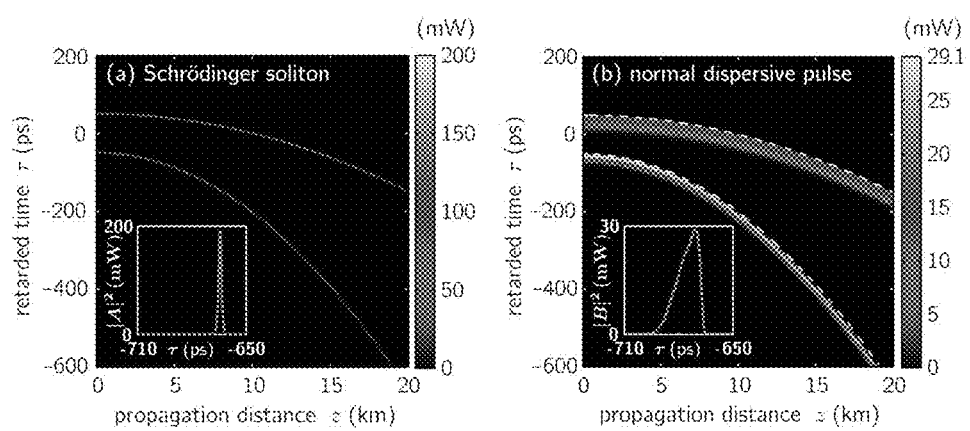
FIG. 2A is a plot of time delay versus propagation distance for a Schrodinger soliton (an anomalous dispersive pulse) in a photonic crystal fiber.
FIG. 2B is a plot of time delay versus propagation distance for a normal dispersive pulse in a photonic crystal fiber.

FIGS. 2A and 2B illustrate the acceleration of a pair of pulses in a photonic crystal fiber and are reproduced from S. Batz and U. Peschel, "Diametrically Driven Self-Accelerating Pulses in a Photonic Crystal Fiber," Physical Review Letters 110, 193901 (2013), which is incorporated herein by reference in its entirety. The photonic crystal fiber (NL-PM-750) has a ZDW of about 750 nm. The first pulse (FIG. 2A) is a Schrodinger soliton with a wavelength of 850 nm and a group velocity dispersion of −20 ps/km$^2$ and a nonlinear coefficient of 0.1 $(W m)^{-1}$ in the photonic crystal fiber. The second pulse (FIG. 2B) has a pulse envelope approximated by the Thomas-Fermi solution with a center wavelength of 673 nm and a group velocity dispersion of 20 ps/km$^2$ and a nonlinear coefficient of 0.1 $(W m)^{-1}$ in the photonic crystal fiber. The pulses have equal but opposite group velocity dispersions as shown in FIG. 1A.

Each plot shows the pulse shape (inset), an upper trace for an acceleration of g=−1 ps/km$^2$, and a lower trace for an acceleration for an acceleration of g=−3 ps/km$^2$. An acceleration of more than zero corresponds to an increase in wavelength of the Schrodinger soliton and a decrease in wavelength of the normal dispersive pulse. An acceleration of less than zero means that the Schrodinger soliton's wavelength decreases and the normal dispersive pulse's wavelength increases.

The curvature of the traces in FIGS. 2A and 2B indicates that the pulses are accelerating. (If the pulses were not accelerating, then the traces would be straight instead of curved.) The change in wavelength shift (blueshift and redshift) with acceleration creates a mechanism for tuning the wavelengths of the pulses. The acceleration depends on the magnitude and sign of the time delay between the pulses, which means that the wavelengths of the pulses can be tuned by changing the time delay between the pulses, the propagation distance, or both.

Figure 3:
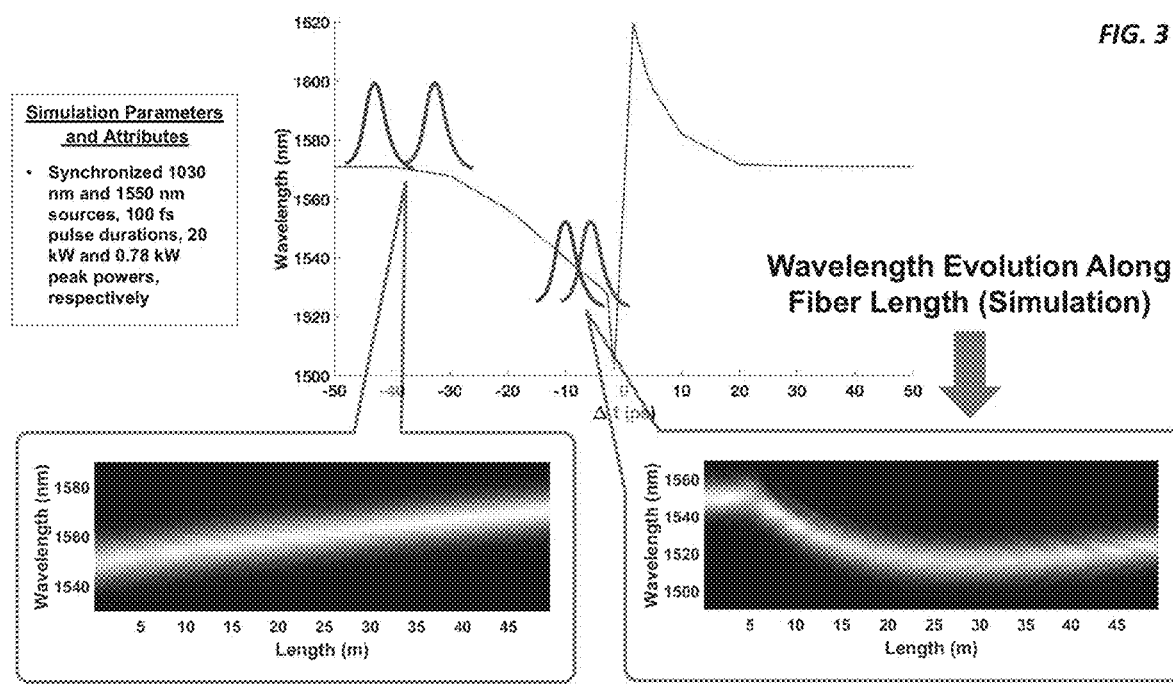
FIG. 3 illustrates how the output wavelength of a pulsed laser can be tuned by varying the relative time delay and propagation distance of a soliton and dispersive wave propagating in the optical waveguide.

FIG. 3 illustrates simulated wavelength tuning by adjusting the time delay between a pair of pulses propagating in a Nufern PM1950 optical fiber. It includes a plot of pulse wavelength versus time delay for pulses emitted by synchronized 1030 nm and 1550 nm laser sources at peak powers of 20 kW and 0.78 kW, respectively. The pulses have 100 fs pulse durations. The plots at the bottom show the evolution of spectrum (vertical axis) versus fiber length (horizontal axis) for a large time delay (lower left) and a small time delay (lower right). Pulses separated by a large time delay interact weakly, producing little tuning (the pulses propagate without interaction if the time delay is large enough), and pulses separated by a small time interact strongly, producing large tuning.

FIG. 3 shows that about 120 nm of tuning is possible in this configuration. Near zero time delay, the output wavelength changes sharply (e.g., at 30-100 nm/ps). As the time delay increases or decreases, the sign and magnitude of the tuning sensitivity change. The wavelength tuning per change in relative time delay between pulses may about 30-100 nm/ps. In other words, the wavelength shift can change with a sensitivity of about 30 nm per ps of time delay to about 100 nm per ps of time delay.

For proper wavelength control, the pulses should be generated by low-temporal jitter laser sources. Fortunately, COTS femtosecond sources are available from the visible (e.g., about 515 nm) to the short-wavelength infrared (SWIR) (e.g., about 1700 nm) showing <10 fs relative timing jitter with locking electronics, enabling nanometer-level center wavelength stability. In this configuration, the time delay can be changed by slightly detuning the pulse repetition frequency (PRF) of one laser with respect to the other, by an electro-optic time delay element, or by another time-delay controller. Another approach is to split a single source laser with a 50/50 coupler, and shift one of the outputs to the desired wavelength with an optical parametric oscillator. Low timing jitter is achievable due to the common source used to generate the two wavelengths, limited only by the stability of the optomechanics. In this configuration, an electro-optic time delay element can be used to adjust the time delay between the pulses.

Figure 4:
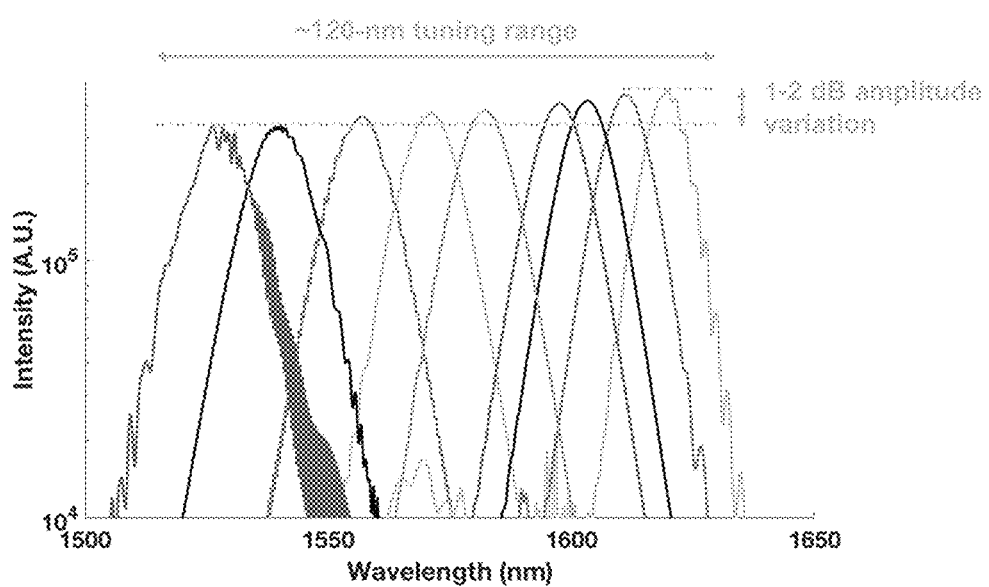
FIG. 4 is a plot of simulated output wavelength at varying time delays for one of the pulses emitted by the tunable pulsed laser.

FIG. 4 is a plot of simulated spectrum over the tuning range of the longer-wavelength pulse at the output of a 50-meter-long Nufern PM1950 optical fiber. Again, the pulses have input wavelengths of 1030 nm and 1550 nm, pulse energies of 4 nJ and 0.15 nJ, and peak powers of 20 kW and 0.78 kW, respectively. Again, the pulse width is about 100 fs, and the pulse spectrum is nearly transform limited. The simulation accounts for a variety of non-ideal effects, including all dispersion orders, stimulated Raman scattering, wavelength-dependent nonlinearity, and wavelength-dependent loss. For input pulses that are transform-limited, the output pulse maintains close to transform-limited performance over the entire 120 nm tuning range, with an amplitude variation of 1-2 dB.

A Tunable Pulsed Laser Source with Mode-Locked Lasers

Figure 5:
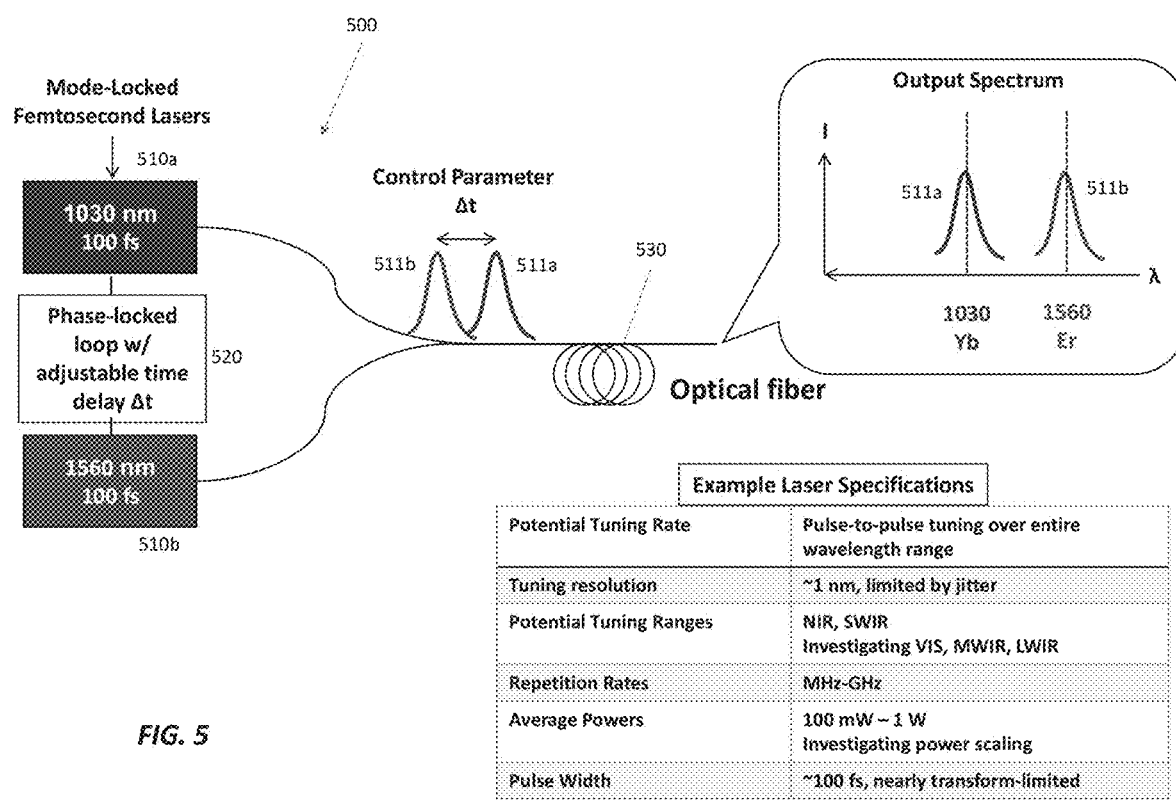
FIG. 5 shows a pulsed laser system whose output is tuned via timed soliton-dispersive wave interaction in an optical waveguide.

FIG. 5 shows a laser system 500 with a first mode-locked laser 510a and a second mode-locked laser 510b (collectively, mode-locked lasers 510). The first mode-locked laser 510a emits pulses 511a at a wavelength of 1030 nm and pulse width of about 100 fs and an averaged power of about 100 mW to about 1 W. Similarly, the second mode-locked laser 510a emits pulses 511b at a wavelength of 1560 nm and a nearly transform-limited pulse width of about 100 fs and an average power of about 100 mW to about 1 W. Because the tuning process is incoherent, the pulses 511a and 511b (collectively, pulses 511) do not have to be phase-matched. The pulses 511 are coupled into an optical fiber 530, where cross-phase modulation causes the pulses 511 to blueshift and redshift by amounts and in directions determined by the magnitude and orientation of the time delay between the pulses as described above.

The optical fiber 530 is about 10 meters to about 30 meters long. It has a zero dispersion wavelength between the wavelengths of pulses 511. In other words, the optical fiber 530 has anomalous dispersion at at least one of the pulse wavelengths. Suitable types of fibers include, but aren't limited to, photonic crystal fiber, hollow core fiber, polarization-maintaining fiber, and even single-mode fiber like Corning SMF-28.

A phase-locked loop (PLL) 520 synchronizes the mode-locked lasers 510 at a repetition rate of Megahertz to Gigahertz with a pulse-to-pulse jitter of less than 10 fs. The PLL 520 applies a small detuning between the pulse repetition frequencies of the mode-locked lasers 510 to change the relative time delay between the pulses 511. Changing the time delay between the pulses 511 shifts the wavelengths of the pulses 511 at the output of the optical fiber 530. The tuning range can be over 100 nm with a pulse-to-pulse tuning of about 100 nm or more (e.g., a wavelength tuning rate of about 100 nm/ns for a 1 GHZ pulse repetition frequency) and a tuning resolution of about 1 nm, as limited by the jitter.

The laser system 500 shown in FIG. 5 can be an all-fiber laser, with the mode-locked lasers 510 coupled to the optical fiber 530 via a fiber-coupled wavelength division multiplexer (WDM) or a fiber coupler (not shown). It can be made with commercial off-the-shelf mode-locked lasers with low timing jitter and other types of waveguides. With commercially available parts, the laser system 500 can operate with a wavelength tuning range of about 10% of the center wavelength with extremely fast tuning speeds and no moving parts. Other wavelengths and wavelength ranges are also possible. For example, the waveguide 530 can include Corning SMF-28 optical fiber, which has a zero-dispersion wavelength of about 1300 nm. This is roughly halfway between 1064 nm and 1550 nm, which are popular wavelengths for pulsed lasers and have substantially equal (within 5-10% of each other) group velocities in Corning SMF-28 optical fiber.

A Tunable Pulsed Laser Source with a Mode-Locked Laser and an OPO

Figure 6:
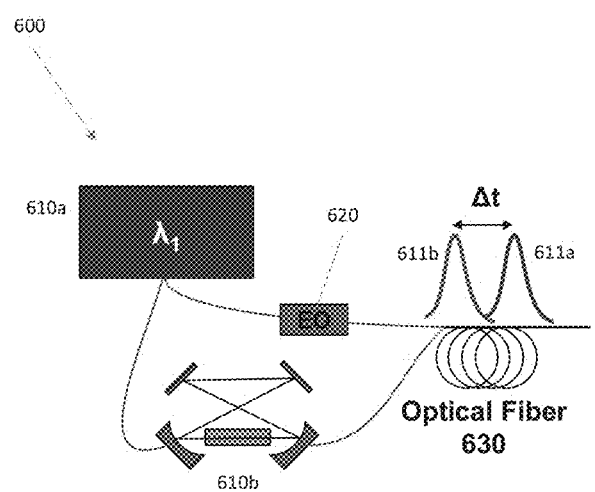
FIG. 6 shows an alternative pulsed laser whose output is tuned via timed soliton-dispersive wave interaction in an optical waveguide.

FIG. 6 shows a laser system 600 with a mode-locked laser 610a and an OPO 610b. The mode-locked laser 610a emits shorter-wavelength pulses 611a that are split and coupled into the OPO 610b and an electro-optic tunable delay element 620. The OPO 610b emits longer-wavelength pulses 611b in response to the shorter wavelength pulses 611a (collectively, pulses 611). Because the mode-locked laser 610a pumps the OPO 610b, the absolute timing (jitter) of the pulses 611 is very stable. If the optomechanical mounts holding the OPO components and free-space components are stable enough, the timing jitter between pulses can be under 10 fs.

The tunable electro-optic delay element 620 delays the shorter-wavelength pulses 611a. Varying the voltage applied to the tunable electro-optic delay element 620 changes the time delay between the shorter-wavelength pulses 611a and the longer-wavelength pulses 611b. A WDM or beamsplitter (not shown) couples the delayed shorter-wavelength pulses 611a and the longer-wavelength pulses 611b into an optical fiber 630, where they shift in wavelength at a rate that depends on the relative time delay imparted by the tunable electro-optic delay element 620.

Linear Chirp Generation with a Fast Tunable Pulsed Laser System

Figure 7:
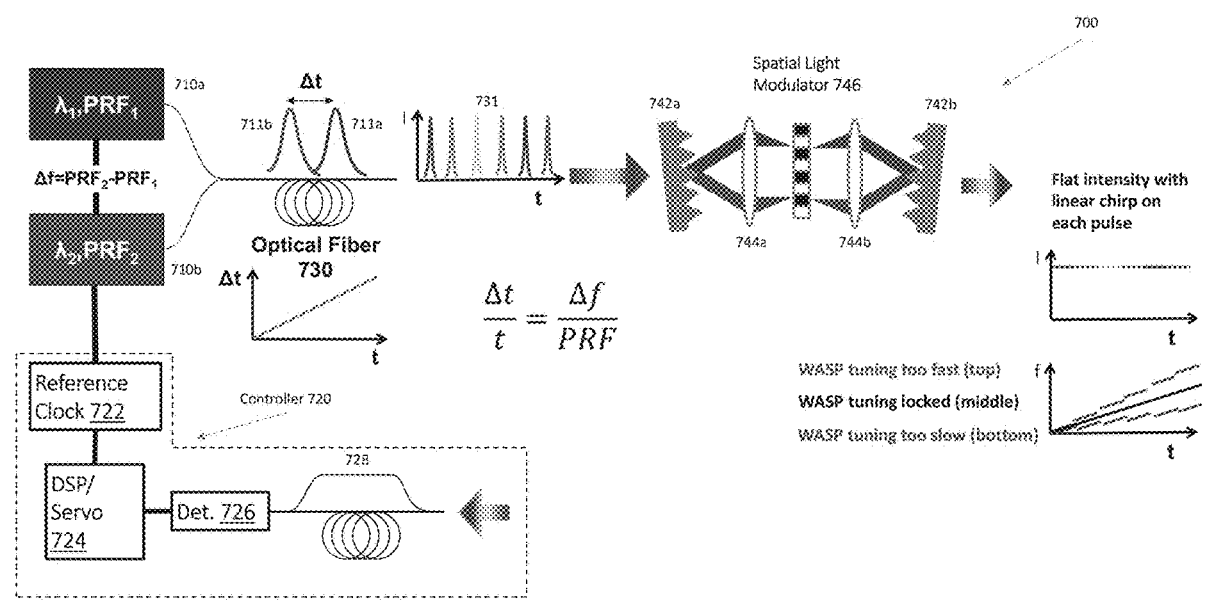
FIG. 7 shows a lidar that uses an inventive tunable laser to generate a fast, linear optical frequency chirp.

FIG. 7 illustrates how to generate a linear optical frequency chirp for a high-resolution LIDAR or hyperspectral imager, etc. with a fast tunable pulsed laser system 700. The system 700 includes a pair of laser sources 710a and 710b (e.g., mode-locked lasers like those in FIG. 5) that emit series of pulses, or pulse trains 711a and 711b (collectively, pulse trains 711) at different wavelengths and different pulse repetition frequencies (PRFs). The pulse trains 711 interact in an optical fiber 730 as explained above, redshifting and blueshifting as they propagate in the optical fiber 730 depending on their relative time delay.

In this case, a controller 720 varies the time delay by changing the frequency offset between the PRFs. The ratio of the frequency offset to the PRF is equal to the rate at which the relative time delay between the pulses changes (seconds of relative time delay per second of maintaining the detuning). If the controller 720 shifts the frequency offset on a pulse-to-pulse basis, the output of the optical fiber 730 is a frequency comb 731 whose orders are separated angularly with a first grating 742a and focused onto a spatial light modulator (SLM) 746 with a first lens 744a. The SLM 746 equalizes the amplitudes of the orders, which recombined with a second lens 744b and a second grating 742b to produce a linear frequency chirp with a flat amplitude (other amplitude profiles are also possible with appropriate modulation using the SLM 746).

The controller 720 measures the chirp rate with an interferometer 728 and a detector 726. The interferometer 728 interferes the chirp with a delayed copy of the chirp to produce a tone whose frequency is proportional to the chirp rate. A digital signal processor (DSP) 724 coupled to the detector 726 measures the frequency and adjusts a reference clock 722 (e.g., a 10 MHz clock) that controls the frequency offset between the PRFs to achieve the desired chirp rate.

Hyperspectral Imaging with a Fast Tunable Pulsed Laser System

Hyperspectral imaging is important in agriculture, environmental monitoring, food safety, biotechnology, and industrial process monitoring. For a typical hyperspectral imaging system, the illumination source is sunlight or another incoherent source of light, meaning data can only be acquired under good lighting conditions. The methods by which the hyperspectral image cube is constructed are time consuming (e.g., "pushbroom" imaging) as a 2D focal plane captures wavelength on one axis and space on the other axis. Thus the line of acquisition must be scanned over the entire scene.

Although hyperspectral imaging systems can pull a target out of background by utilizing unique spectral signatures, they are slow and computationally expensive, often requiring several minutes to acquire and then process data. By using a fast tunable pulsed laser like those described here, a spectrum can be adaptively synthesized that optimizes image contrast within milliseconds, reducing the amount of data required and eliminating the need for hyperspectral imaging altogether. Fast tuning is especially useful for spectroscopic applications where full spectral data must be acquired quickly, for example, in monitoring of combustion processes in engines at a particular point in the cycle.

Figure 8:
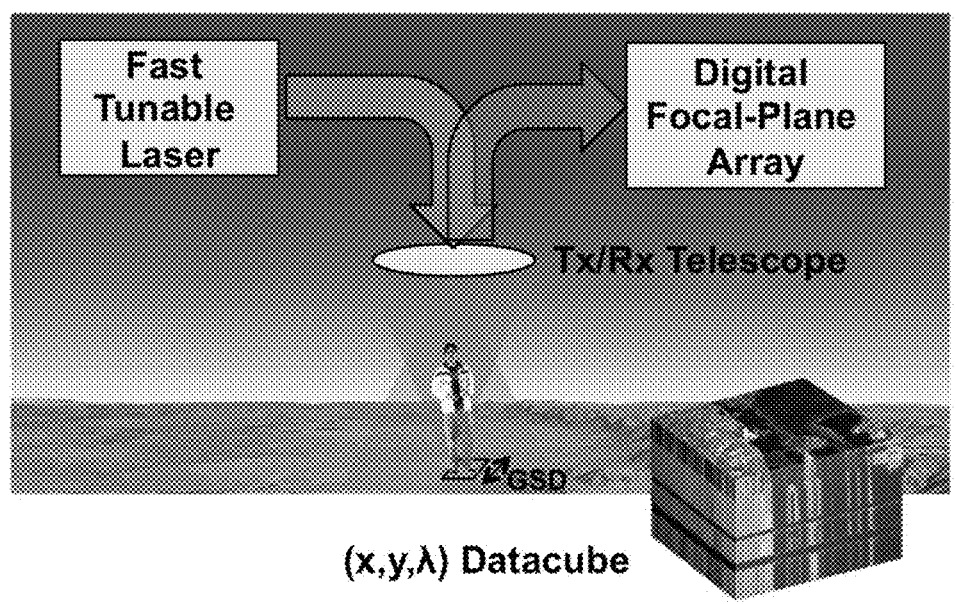
FIG. 8 illustrates active hyperspectral imaging using a wavelength-agile, short-pulse laser to illuminate a scene and a high-speed digital focal-plane array (DFPA) synchronized to the wavelength output of the laser to detect a return from the scene.

FIG. 8 illustrates how a fast tunable laser can be used for active hyperspectral imaging by illuminating a scene with the deterministic, controllable wavelength output of the laser, and capturing the return with a digital focal plane array (DFPA). Thus, each frame contains a two-dimensional image at a different, and known, wavelength. With the fast tuning speed of the laser and the fast frame rate and onboard processing of a DFPA, this should allow hyperspectral image acquisition and processing to take place much faster.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A laser system comprising:
    a first laser source to emit a first pulse at a first wavelength;
    a second laser source to emit a second pulse at a second wavelength different than the first wavelength;
    a controller, operably coupled to at least one of the first laser source or the second laser source, to vary a time delay between the first pulse and the second pulse; and
    an optical waveguide in optical communication with the first laser source and the second laser source and having a zero-dispersion wavelength between the first wavelength and the second wavelength, to guide the first pulse and the second pulse, cross-phase modulation in the optical waveguide causing the first pulse to shift the second wavelength by a first wavelength shift and the second pulse to shift the first wavelength by a second wavelength shift, the first wavelength shift and the second wavelength shift depending on the time delay.

2. The laser system of claim 1, wherein the first laser source is incoherent with respect to the second laser source.

3. The laser system of claim 1, wherein:
    the first laser source comprises a first mode-locked laser;
    the second laser source comprises a second mode-locked laser; and
    the controller comprises a phase-locked loop, operably coupled to the first mode-locked laser and the second mode-locked laser, to synchronize emission of the first pulse by the first mode-locked laser with emission of the second pulse by the second mode-locked laser.

4. The laser system of claim 3, wherein the phase-locked loop is configured to synchronize the first mode-locked laser to the second mode-locked laser with a timing jitter of less than 10 femtoseconds.

5. The laser system of claim 3, wherein the controller is configured to detune a pulse repetition rate of the first mode-locked laser with respect to a pulse repetition rate of the second mode-locked laser so as to adjust the time delay.

6. The laser system of claim 1, wherein:
    the first laser source comprises a mode-locked laser to emit the first pulse;
    the second laser source comprises an optical parametric oscillator, in optical communication with the mode-locked laser, to emit the second pulse in response to the first pulse; and the controller comprises an electro-optical element, in optical communication with the first laser source, to adjust the time delay.

7. The laser system of claim 1, wherein the first pulse has a first group velocity in the optical waveguide and the second pulse has a second group velocity in the optical waveguide substantially equal to the first group velocity.

8. The laser system of claim 1, wherein the first pulse is a soliton in an anomalous dispersion regime of the optical waveguide and the second pulse is in a normal dispersion regime of the optical waveguide.

9. The laser system of claim 1, wherein the optical waveguide comprises an optical fiber having a length of about 10 meters to about 30 meters.

10. The laser system of claim 1, wherein the cross-phase modulation causes the first wavelength to shift toward the second wavelength.

11. The laser system of claim 1, wherein the cross-phase modulation causes the first wavelength to shift away from the second wavelength.

12. The laser system of claim 1, wherein the first wavelength shift is at least about 100 nanometers and the second wavelength shift is at least about 100 nanometers.

13. A method comprising:
coupling a first series of laser pulses at a first wavelength into an optical waveguide; and
coupling a second series of laser pulses at a second wavelength into the optical waveguide, cross-phase modulation in the optical waveguide causing the first series of pulses to shift the second wavelength by a first wavelength shift; and
varying a time delay between the first series of pulses and the second series of pulses so as to tune the first wavelength shift.

14. The method of claim 13, wherein cross-phase modulation in the optical waveguide causes the second series of pulses to shift the first wavelength by a second wavelength shift.

15. The method of claim 13, wherein the cross-phase modulation causes the second wavelength to shift toward the first wavelength.

16. The method of claim 13, wherein the cross-phase modulation causes the second wavelength to shift away from the first wavelength.

17. The method of claim 13, further comprising:
emitting the first series of pulses from a first laser;
emitting the second series of pulses from a second laser temporally incoherent with the first laser.

18. The method of claim 13, further comprising:
synchronizing emission of the first series of pulses with emission of the second series of pulses with a timing jitter of less than 10 femtoseconds.

19. The method of claim 13, wherein the optical waveguide has a zero dispersion wavelength between the first wavelength and the second wavelength.

20. The method of claim 13, wherein the first pulse has a first group velocity in the optical waveguide and the second pulse has a second group velocity in the optical waveguide substantially equal to the first group velocity.

21. The method of claim 13, wherein the first pulse is a soliton in an anomalous dispersion regime of the optical waveguide and the second pulse is in a normal dispersion regime of the optical waveguide.

22. The method of claim 13, wherein varying the time delay tunes the first wavelength shift with a sensitivity of about 30 nm per ps of time delay to about 100 nm per ps of time delay.

23. A laser system comprising:
a first mode-locked laser to emit a first series of pulses at a first wavelength and a first pulse repetition frequency;
a second mode-locked laser to emit a second series of pulses at a second wavelength different than the first wavelength and at a second pulse repetition frequency;
an optical waveguide in optical communication with the first mode-locked laser and the second mode-locked laser and having a zero-dispersion wavelength between the first wavelength and the second wavelength, to guide the first series of pulses and the second series of pulses; and
a controller, operably coupled to the first mode-locked laser and the second mode-locked laser, to vary a frequency offset between the first pulse repetition frequency and the second pulse repetition frequency, the frequency offset causing a change in time delay between the first series of pulses and the second series of pulses, the change in the time delay causing a change in the first wavelength through a change in strength of cross-phase modulation of the first series of pulses by the second series of optical pulses in the optical waveguide.

24. The laser system of claim 1, wherein the first laser source is a first tunable pulsed laser source and the second laser source is a second tunable pulsed laser source.

* * * * *